United States Patent [19]

Hongo et al.

[11] Patent Number: 5,049,348

[45] Date of Patent: Sep. 17, 1991

[54] METHOD FOR PRODUCING THERMOPLASTIC RESIN COMPOUND

[75] Inventors: Masafumi Hongo; Hideyuki Shigemitsu, both of Hiroshima, Japan

[73] Assignee: Mitsubishi Rayon Co., Ltd., Japan

[21] Appl. No.: 413,848

[22] Filed: Sep. 28, 1989

[30] Foreign Application Priority Data

Oct. 28, 1988 [JP] Japan ................................ 63-270968

[51] Int. Cl.$^5$ .......................... C08J 5/00; C08L 51/04; C08L 67/02; C08L 71/12
[52] U.S. Cl. .......................... 264/331.18; 264/331.12; 264/331.13; 264/331.21; 525/68; 525/92; 525/397; 525/905
[58] Field of Search .............. 264/349, 331.13, 331.18, 264/331.12, 331.21; 525/68, 397, 92, 905

[56] References Cited

U.S. PATENT DOCUMENTS 4,547,541 10/1985 Golba, Jr. ........................... 264/349
4,786,664 11/1988 Yates .

FOREIGN PATENT DOCUMENTS 0265946 5/1988 European Pat. Off. .
0276327 8/1988 European Pat. Off. .
0283837 9/1988 European Pat. Off. .

*Primary Examiner*—Jacob Ziegler
*Attorney, Agent, or Firm*—Brumbaugh, Graves, Donohue & Raymond

[57] ABSTRACT

With the aim of preventing deterioration in properties of resins in the production of a thermoplastic resin compound by melting and kneading a polyester resin and a polyphenylene ether resin, a method for producing the thermoplastic resin compound comprising 30 to 70% by weight of a polyester resin (A) mainly comprising polyalkylene terephthalate and 70 to 30% by weight of a polyphenylene ether resin (B) mainly comprising polyphenylene ether comprises separately melting the component (A) and the component (B) and, after adjusting the ratio of viscosity (in poise) of the component (B) to that of the component (A) at a shear rate of $10^3(\sec^{-1})$ to 10 or less, kneading the molten components (A) and (B) together.

4 Claims, No Drawings

METHOD FOR PRODUCING THERMOPLASTIC RESIN COMPOUND

BACKGROUND OF THE INVENTION

1. Field of the Invention

This invention relates to a production method for a thermoplastic resin compound, in particular, a thermoplastic resin compound comprising a polyester resin mainly based on a polyalkylene terephthalate and a polyphenylene ether resin mainly based on a polyphenylene ether, which can be processed into moldings with enhanced heat resistance and impact resistance.

2. Description of the Prior Art

Thermoplastic polyester resins such as those based on polyalkylene terephthalate, for their good moldability, mechanical properties, thermal stability, and electrical insulation properties, are used in a wide range of applications such as electric and electronic parts and automotive parts. However, conventional art thermoplastic polyester resins are low in rigidity at high temperatures and in impact resistance, in particular, to notch impact, and thus cannot be used in automotive exterior panels for on-line painting.

With the aim of improving the high-temperature rigidity and impact resistance of thermoplastic polyester resins, Japanese Patent Publication Laid-open Nos. 63-500387/1988, 62-121760/1987, 62-121757/1987, 62-129343/1987, and 62-129342 disclose resin compounds comprising the above resin mixed with a polyphenylene ether resin and an impact resistance improver. These resin compounds are improved in terms of high-temperature rigidity and impact resistance, and thus are expected to be applied to applications to which conventional thermoplastic polyester resins could not be applied.

However, in the resin compounds disclosed in the above patents, the polyphenylene ether resin and the polyester resin differ in glass transition temperature by nearly 200° C. Therefore, these resins, when kneaded using an ordinary twin-screw extruder, tend to cause generation of shear heat. In particular, when an extruder having a high shear rate, such as an extruder with a diameter of 40 mm or more, a type which is used in commercial production, is used, these resins tend to decompose due to large amounts of heat generated during extrusion, leading to deterioration in properties of the resins. Use of a single-screw extruder tends to have an insufficient kneading effect, resulting in lumps of unmolten polyphenylene ether resin in the molding.

DESCRIPTION OF THE PREFERRED EMBODIMENTS

The inventors of the present invention have intensively investigated a production method for a resin compound comprising a thermoplastic polyester resin and a polyphenylene ether resin, which has improved thermal stability. As a result, it has been found that the object of the present invention can be attained by melting and kneading both resins within a predetermined range of viscosity ratio and forming under a controlled resin temperature, thus accomplishing the present invention.

In accordance with the present invention, there is provided a method for producing a thermoplastic resin compound comprising 30 to 70% by weight of a polyester resin (A) based mainly on polyalkylene terephthalate and 70 to 30% by weight of a polyphenylene ether resin (B) based mainly on polyphenylene ether; characterized in that the component (A) and the component (B) are separately melted and, after the ratio of viscosity (in poise) of the component (B) to that of the component (A) at a shear rate of $10^3$ (sec$^{-1}$) is adjusted to 10 or less, the molten components (A) and (B) are kneaded together.

The polyester resin (A) and polyphenylene ether resin (B) used in the present invention are not specifically restricted, but those of which viscosity ratio (viscosity (poise) of the component (B)/viscosity (poise) of the component (A)) can be adjusted to 10 or less may be used. These components are preferably melted using a single-screw extruder or a twin-screw extruder. In the kneading using an extruder, it is specifically preferable that the discharge port of one extruder is connected to the intermediate portion of the other extruder.

If the viscosity ratio of the component (B) to the component (A) is greater than 10, evolution of shearing heat becomes excessive, which may accelerate decomposition of the polymers or the polyphenylene ether resin may not be finely dispersed, either of which is not preferable.

The content of the component (A) in the resin compound (hereinafter referred to as the "entire resin compound") is 30 to 70% by weight, and the content of the component (B) is 70 to 30% by weight. A resin compound of a ratio out of this range tends to have insufficient properties of the resin compound according to the present invention.

In the present invention, the polyalkylene terephthalate as the main constituent of the polyester resin (A) is produced by reacting primarily an aromatic dicarboxylic acid having 8 to 22 carbon atoms with an alkylene glycol having 2 to 22 carbon atoms, a cycloalkylene glycol, or an aralkylene glycol, with small amounts of an aliphatic dicarboxylic acid, such as adipic acid or sebacic acid, included as needed. A polyalkylene glycol, such as polyethylene glycol or tetramethylene glycol, may also be included as a constituent. As the polyalkylene terephthalate, polyethylene terephthalate and polytetramethylene terephthalate are specifically preferable.

The above polyester resin (A), in addition to the above polyalkylene terephthalate, preferably contains polycarbonate resins. The polycarbonate resins that can be added to the polyester resin (A) include one which is obtained from dihydroxydiarylalkane, which may be branched in any configuration. These polycarbonate resins are produced by a conventional method known in the art, generally by a reaction of a dihydroxy or polyhydroxy compound with phosgene or a carbonic diester. Preferable dihydroxyalkanes include those which have an alkyl group, a chlorine atom, or a bromine atom at the ortho-position with respect to the hydroxyl group. Preferable dihydroxyalkanes include 4,4'-dihydroxy-2,2-diphenylpropane (bisphenol A), tetramethylbisphenol A, and bis (4-hydroxyphenyl-p-diisopropylbenzene. The branched polycarbonate is produced by substituting part of the dihydroxy compound with a polyhydroxy compound, for example, in an amount of 0.2 to 2 mole %.

The polycarbonate resin, when used, is added preferably in an amount of 5 to 28% by weight to the entire resin compound. By the addition of the polycarbonate, the impact resistance of the resin compound can be remarkably improved. Addition of the polycarbonate in amounts of less than 5% by weight has an insufficient improvement effect on the impact resistance, and addition of the polycarbonate in amounts of exceeding 28% by weight tends to result in a low rigidity at high temperatures.

The polyphenylene ether as the main constituent of the polyphenylene ether resin (B) of the present invention is a homopolymer or a copolymer having a repetition unit of the formula:

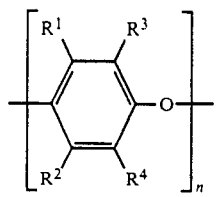

(wherein $R_1$, $R_2$, $R_3$ and $R_4$ are each independently selected from the group consisting of hydrogen atom, and alkyl group, halogen atom, nitro and amino groups, and n is 30 or greater, preferably 50 or greater).

The polyphenylene ether includes poly-(2,6-dimethyl-1,4-phenylene) ether, poly-(2,3,6-trimethyl-1,4-phenylene) ether, poly(2,6-diethyl-1,4-phenylene) ether, poly-(2,6-dipropyl-1,4-phenylene) ether, poly-(2-methyl-6-ethyl-1,4-phenylene) ether, poly-(2-methyl-6-propyl-1,4-phenylene) ether, poly-(2-ethyl-6-propyl-1,4-phenylene) ether, a copolymer of (2,6-dimethyl-1,4-phenylene) ether and (2,3,6-trimethyl-1,4-phenylene) ether, a copolymer of (2,6-diethyl-1,4-phenylene) ether and (2,3,6-trimethyl-1,4-phenylene) ether, and a copolymer of (2,6-dimethyl-1,4-phenylene) ether and (2,3,6-triethyl-1,4-phenylene) ether. Of these, in particular, poly-(2,6-dimethyl-1,4-phenylene) ether, poly-(2,3,6-trimethyl-1,4-phenylene) ether, and a copolymer of (2,6-dimethyl-1,4-phenylene) ether and (2,3,6-trimethyl-1,4-phenylene) ether are preferable, poly-(2,6-dimethyl-1,4-phenylene) ether and poly-(2,3,6-trimethyl-1,4-phenylene) ether are more preferable, and poly-(2,6-dimethyl-1,4-phenylene) ether is most preferable.

The degree of polymerization of the polyphenylene ether is not specifically restricted, but it is preferable that the polymer has a reduced viscosity of 0.3 to 0.7 dl/g in chloroform at 25° C. Polyphenylene ether having a reduced viscosity of less than 0.3 dl/g tends to have deteriorated thermal stability, and that with a reduced viscosity exceeding 0.7 dl/g tends to have impaired moldability.

The polyphenylene ether resin (B) preferably comprises the above polyphenylene ether, which is further mixed with a graft polymer, a block copolymer, or a polystyrene resin.

The graft polymer, which is added to the polyphenylene ether resin (B), is obtained by graft-polymerizing one or more monomers selected from the group consisting of aromatic vinyl monomers and methacrylic ester monomers, in the presence of a rubbery polymer.

The rubbery polymer includes polybutadiene rubber; a copolymer containing 50% by weight or more butadiene units and small amounts of styrene units and acrylonitrile units, such as a styrene-butadiene copolymer or an acrylonitrile-butadiene copolymer; a polyacrylic ester rubber such as polybutyl acrylate; a polyorganosiloxane rubber; a composite rubber such as a polybutadiene/polybutyl acrylate double-structured rubbery polymer comprising polybutadiene and a polybutylacrylate outer layer; and mixtures of two or more of the above polymers. The graft polymer preferably contains the rubbery polymer in an amount of 30 to 80% by weight.

Aromatic vinyl monomers that can be used in the graft polymerization include styrene and α-methylstyrene. The methacrylic ester monomers include methyl methacrylate and ethyl methacrylate. These monomers are used alone or in combination. In the present invention, in addition to these aromatic vinyl monomers and methacrylic ester monomers, small amounts of other copolymerizable monomers can also be used. Such copolymerizable monomers include acrylic ester monomers such as methyl acrylate and butyl acrylate, and maleimide monomers such as N-phenyl maleimide. Cyanovinyl monomers such as acrylonitrile and methacrylonitrile are not preferable for use in the present invention because they tend to lower the impact resistance and high-temperature rigidity of moldings produced from the resulting resin compound.

When used, the graft polymer is added preferably in an amount of 5 to 35% by weight to the entire resin compound. The addition of the graft polymer improves the impact resistance of the moldings, however, a content of the graft polymer of less than 5% by weight tends to have an insufficient improvement effect on the impact resistance, and a content of more than 35% by weight tends to lower the rigidity at high temperatures.

The block copolymer, which is added to the polyphenylene ether resin (B) as needed, is a polymer having an intermediate block comprising butadiene, isoprene, chloroprene, ethylene, and propylene, and both end blocks mainly comprising styrene. The tri-block copolymer, as in the case of the graft polymer, is added in an amount of 5 to 35% by weight.

The polystyrene resin, which is added to the polyphenylene ether resin (B) as needed, includes polystyrene resin and rubber-modified polystyrene resin, which comprise at least 50% by weight of styrene monomer. The styrene resin is contained in an amount of 0 to 35% by weight to the entire resin compound. A resin compound containing the styrene resin in an amount out of this range tends to have insufficient effects of the present invention, and thus is not preferable.

To the resin compound according to the present invention can be added as needed various types of additives such as modifiers, stabilizers to light or heat, reinforcing fillers, fire-retardant agents, release agents, dyes or pigments. For example, such modifiers to improve the impact resistance include a glycidyl-group-containing copolymer comprising an α-olefin and a glycidyl ester of an α,β-unsaturated acid, and a phenoxy rein. Furthermore, in general, talc is added as a crystallization promotor for the thermoplastic polyester resin.

The polyester resin (A) and the polyphenylene ether resin (B) can be separately mixed using a Henschel mixer or a tumbler.

As can be seen from Table 4 showing the properties of the thermoplastic polyester resin produced according to the present invention, for example, the resin compound of Example 1 is lower in resin temperature and high in SS pressure and Izod impact strength than the resin compound of Comparative Example 1. This would be attributed to the fact that the resin temperature in Example 1 is controlled to a lower value than that in Comparative Example 1, thereby decomposition of the resin is suppressed. The method according to the present invention enables forming while controlling the resin temperature, thus resulting in the high Izod impact strength as shown in Table 4.

EXAMPLES

The present invention will now be described in detail with reference to Examples. In the description, "part" means "part by weight" unless otherwise noted.

(A) In the Examples and Comparative Examples, individual properties were measured by the following methods:

(1) Izod impact strength

Measured according to ASTM D-256 at 23° C. and 50% RH. (A ¼-inch thick, notched specimen used)

(2) Resin temperature

The temperature (in °C.) of the resin was measured at the outlet of the extruder using a resin thermometer (Type E of Anritsu Keiki).

(3) Melt viscosity

Melt viscosity was measured at a shear rate of $10^3(sec^{-1})$ using a capillograph (made by Toyo Seiki Seisakusho). The capillary used was 1 mm in diameter and 10 mm in length.

(4) Short shot pressure (SS pressure)

SS pressure was determined as percentage to the maximal pressure (2,000 kgf.cm/cm) for molding a 100 mm square, 3 mm thick plate using the M-100 (made by Meiki Seisakusho) at a cylinder temperature of 260° C.

The polyphenylene ether resin used in the Examples and Comparative Examples was a copolymer of (2,6-dimethyl-1,4-phenylene) ether and (2,3,6-trimethyl-1,4-phenylene) ether, which had a reduced viscosity ($\eta sp/c$) of 0.1% chloroform solution at 25° C. of 0.59 dl/g measured by means of a Uberode type viscometer. Polytetramethylene terphthalate used had an intrinsic viscosity $[\eta]$ of 1.05.

The polycarbonate resin used was "Novarex 7025" (brandname, from Mitsubishi Kasei); the styrene-ethylene/butylene-styrene block copolymer used was "Krayton G1650" (brandname, from Shell Chemical); the ethylene-glycidyl methacrylate copolymer used was "Bond First E" (brandname, from Sumitomo Chemical); the crystallization promotor used was "Micro-Talc MP10-52" (brandname, from Pfizer MSP); and the styrene resin used was "Estyrene G15" (brandname, Shinnittetsu Chemical).

REFERENCE EXAMPLE 1

Preparation of Graft Polymer 1

A reaction vessel was charged with 59 parts (as solid) of polybutadiene latex having a solid content of 33% by weight and an average particle diameter of 0.08 μm, to which 1 part (as solid) of a copolymer latex comprising 85% by weight of n-butyl methacrylate and 15% by weight of methacrylic acid having an average particle diameter of 0.08 μm was added under stirring at room temperature, and agitation was continued for 30 minutes to obtain a grown polybutadiene rubber latex having an average particle diameter of 0.28 μm. After the atmosphere in the vessel was purged with nitrogen, 50 parts of distilled water, 0.2 parts of Demol N (naphthalene sulfonic acid-formaldehyde condensate: from Kao), 0.02 parts of sodium hydroxide, and 0.35 parts of dextrose were added to the grown polybutadiene rubber latex under agitation. The mixture was then heated to 60° C., and 0.05 parts of ferrous sulfate and 0.2 parts of sodium pyrophosphate were added, immediately followed by continuous dropping of a mixture of 40 parts of styrene and 0.2 parts of cumene hydroperoxide over a period of 60 minutes. After completion of the dropping, the reaction mixture was maintained for 1 hour to complete graft polymerization. After cooling, the resulting graft polymer latex was coagulated with dilute sulfuric acid by a conventional method known in the art, washed, filtered, and dried to obtain a graft polymer 1.

EXAMPLES 1-4

The above-described polytetramethylene terephthalate and polycarbonate resin were mixed in ratios shown in Table 1 for 5 minutes in a Henschel mixer to obtain component (A).

The polyphenylene ether resin and the graft copolymer or the block copolymer were also mixed in ratios shown in Table 1 for 5 minutes in a Henschel mixer to obtain component (B).

The component (A) and the component (B) were separately melted and kneaded using the following procedures.

The component (A) was melted using a single-screw extruder A (diameter 40 mm, L/D=31, made by Tanabe Plastic).

A twin-screw extruder B (diameter 44 mm, L/D=30, made by Nippon Seiko) was used for melting the component (B) and for mixing and kneading of the molten components (A) and (B).

The extruder B was divided into eight blocks, and the outlet of the extruder A was connected to the 5th block with respect to the hopper. The component (A) was melted by the extruder A, the component (B) was melted by the extruder B, and the component (A) and the component (B) were combined at the connection and kneaded.

Using the system, these materials were pelletized under the conditions shown in Table 2, and the resulting samples were subjected to evaluation tests.

EXAMPLES 5-7

The component (A) and the component (B), which are the same as used in Examples 1-4, were separately mixed in a Henschel mixer.

The component (A) and the component (B) were respectively melted and kneaded using the following procedures.

The component (A) was melted using a twin-screw extruder A (diameter 35 mm, L/D=25, made by Toshiba Machine).

A twin-screw extruder B (diameter 44 mm, L/D=30, made by Nippon Seiko) was used for melting the component (B) and for mixing and kneading of the molten components (A) and (B).

The extruder B was divided into eight blocks, and the outlet of the extruder A was connected to the 5th block with respect to the hopper.

Using the system, these materials were pelletized under the conditions shown in Table 2, and the resulting samples were subjected to evaluation tests.

COMPARATIVE EXAMPLES 1-2

The component (A) and the component (B) shown in the Examples were mixed by a Henschel mixer. The resulting mixture of the components (A) and (B) was pelletized using a twin-screw extruder (diameter 44 mm, made by Nippon Seiko), and subjected to evaluation tests.

COMPARATIVE EXAMPLE 3

The same components as in Examples 1-4 were pelletized using the same method, but in ratios of the component (B) to the component (A) exceeding 10.

TABLE 2

|  | (forming conditions) | | | | | | | | | |
|---|---|---|---|---|---|---|---|---|---|---|
|  | Example | | | | | | | Comparative Example | | |
|  | 1 | 2 | 3 | 4 | 5 | 6 | 7 | 1 | 2 | 3 |
| Component (A) | | | | | | | | | | |
| Single-screw extruder (40 mm) setting temperature °C. | 240 | 240 | 240 | 230 |  |  |  |  |  | 300 |
| Single-screw extruder (40 mm) rotation rpm | 80 | 80 | 80 | 80 |  |  |  |  |  | 80 |
| Component (A) feed rate kg/hr | 23 | 25 | 33 | 23 |  |  |  |  |  | 23 |
| Component (B) feed rate kg/hr | 19 | 17 | 27 | 19 | 19 | 19 | 17 | A+B 42 | A+B 42 | (B) 19 |
| Twin-screw extruder (35 mm) setting temperature °C. |  |  |  |  | 220 | 220 | 220 |  |  |  |
| Twin-screw extruder (35 mm) rotation rpm |  |  |  |  | 250 | 300 | 200 |  |  |  |
| Component (A) feed rate kg/hr |  |  |  |  | 23 | 23 | 25 |  |  |  |
| Component (B) + (A) | | | | | | | | | | |
| Twin-screw extruder (44 mm) setting temperature °C. | 250 | 250 | 220 | 220 | 250 | 220 | 250 | 250 | 250 | 250 |
| Twin-screw extruder (44 mm) rotation rpm | 250 | 250 | 300 | 250 | 250 | 250 | 250 | 250 | 250 | 250 |

TABLE 3

|  | (temperature) | | | | | | | | | |
|---|---|---|---|---|---|---|---|---|---|---|
|  | Example | | | | | | | Comparative Example | | |
|  | 1 | 2 | 3 | 4 | 5 | 6 | 7 | 1 | 2 | 3 |
| Component (A) | | | | | | | | | | |
| Resin temperature °C. | 243 | 250 | 242 | 244 | 250 | 248 | 254 |  |  | 300 |
| Viscosity poise $\times 10^3$ | 3.2 | 5.2 | 3.2 | 3.8 | 3.0 | 3.3 | 2.8 |  |  | 0.28 |
| Component (B) | | | | | | | | | | |
| Resin temperature °C. | 290 | 295 | 288 | 284 | 298 | 290 | 286 |  |  | 290 |
| Viscosity poise $\times 10^4$ | 1.7 | 2.0 | 1.2 | 0.9 | 2.2 | 1.5 | 1.5 |  |  | 1.7 |

TABLE 1

|  | (compound) | | | | | | | | | |
|---|---|---|---|---|---|---|---|---|---|---|
|  | Example | | | | | | | Comparative Example | | |
|  | 1 | 2 | 3 | 4 | 5 | 6 | 7 | 1 | 2 | 3 |
| Component (A) | | | | | | | | | | |
| Polytetramethylene terephthalate (part) | 40 | 45 | 40 | 35 | 45 | 40 | 50 | 40 | 45 | 40 |
| Polycarbonate resin (part) | 15 |  | 15 | 20 | 10 | 10 | 10 | 15 |  | 15 |
| Bond First E (part) |  | 15 |  |  |  | 5 |  |  | 15 |  |
| Micro-talc MP1052 (part) |  | 0.5 | 0.3 |  |  | 0.3 |  |  | 0.5 |  |
| Component (B) | | | | | | | | | | |
| Polyphenylene ether (part) | 30 | 30 | 30 | 25 | 35 | 30 | 25 | 30 | 30 | 30 |
| Graft polymer I (part) | 15 | 10 |  |  | 10 | 10 | 15 | 15 | 10 | 15 |
| Krayton G1650 (part) |  |  | 15 | 10 |  | 5 |  |  |  |  |
| Estyrene G15 (part) |  |  |  | 10 |  |  |  |  |  |  |

TABLE 4

| | (resin properties) | | | | | | | | | |
|---|---|---|---|---|---|---|---|---|---|---|
| | Example | | | | | | | Comparative Example | | |
| | 1 | 2 | 3 | 4 | 5 | 6 | 7 | 1 | 2 | 3 |
| Twin-screw extruder (44 mm) outlet resin temperature °C. | 287 | 295 | 285 | 283 | 289 | 286 | 288 | 320 | 335 | 300 |
| ¼" mold notched Izod impact strength kgf · cm/cm | 12.0 | 14.0 | 11.0 | 13.5 | 10.5 | 14.5 | 11.0 | 5.0 | 4.5 | 6.0 |
| S S pressure % | 42 | 48 | 37 | 36 | 43 | 40 | 44 | 35 | 36 | 30 |

We claim:

1. A method for producing a thermoplastic resin composition comprising the steps of
   combining polyalkylene terephthalate with at least one polymer selected from the group consisting of polycarbonate resin and ethyleneglycidylmethacrylate copolymer to form 30 to 70% by weight of component (A);
   combining polyphenylene ether with at least one polymer selected from the group consisting of rubber based graft copolymer, polystyrene resin and comprising the step of melting said component (A) and said compnent (B) block copolymer to form 70 to 30% by weight of component (B); and
   separately and, after the ratio of viscosity (in poise) of said molten (B) to that of said molten (A) at a shear rate of $10^3(\text{sec}^{-1})$ is adjusted to 10 or less, kneading said molten (A) and (B) together.

2. A method for producing a thermoplastic resin composition as in claim 1 wherein said (A) comprises polycarbonate resin in an amount of 5 to 28% by weight of the entire resin compound.

3. A method for producing a thermoplastic resin composition as in claim 1 wherein said (B) comprises said graft copolymer in an amount of 5 to 35% by weight of the entire resin compound.

4. A method for producing a thermoplastic resin compound as in claim 1 wherein said (B) comprises said block copolymer in amount of 5 to 35% by weight of the entire resin composition.

* * * * *

UNITED STATES PATENT AND TRADEMARK OFFICE
CERTIFICATE OF CORRECTION

PATENT NO. : 5,049,348
DATED : September 17, 1991
INVENTOR(S) : Hongo et al.

It is certified that error appears in the above-identified patent and that said Letters Patent is hereby corrected as shown below:

Column 9, line 29, through column 10, line 14, "comprising the step of melting said component (A) and said component (B) block copolymer to form 70 to 30% by weight of component (B); and separately and," should read --block copolymer to form 70 to 30% by weight of component (B), and comprising the step of melting said component (A) and said component (B); and--.

Signed and Sealed this

Twenty-fifth Day of May, 1993

Attest:

MICHAEL K. KIRK

Attesting Officer

Acting Commissioner of Patents and Trademarks